UNITED STATES PATENT OFFICE.

DECIUS W. CLARK, OF CHICAGO, ILLINOIS.

IMPROVEMENT IN ENAMELING BRICKS.

Specification forming part of Letters Patent No. 152,213, dated June 23, 1874; application filed December 18, 1873.

*To all whom it may concern:*

Be it known that I, DECIUS W. CLARK, of Chicago, in the county of Cook and State of Illinois, have invented a new and useful Improvement in Enameled Bricks; and I do hereby declare that the following is a full, clear, and exact description thereof.

In the process of enameling brick it has been found necessary to have brick made of a particular kind of clay, or of a combination of different kinds of clay, compounded, molded, and burned in a peculiar way, so that they will receive the enameling compound, and cause it to adhere to the surface of the brick after being subjected to the baking operation in the enameling process.

My improvement relates to the enameling of the ordinary red building-brick. The nature of my invention consists in enameling the desired surface of ordinary red building-brick through the medium of the enameling compound hereinafter described, whereby a smooth and highly-polished enameled surface is given to the brick, rendering it impervious to the action of the atmosphere in all climates and seasons of the year.

To enable others skilled in the art to make and use my new article of manufacture, I will proceed to describe more fully its construction and use.

In preparing the enameling compound I take about one hundred and fifty parts of fluor-spar, about sixty parts of paris white, about fifty parts of lime, about fifty parts of oxide of tin or its equivalent, and about fifty parts of kaoline. These ingredients I pulverize and triturate to an impalpable powder, reducing the whole to a homogeneous mass, which I place in a crucible or other suitable vessel, and calcine it. After this calcined mass is cooled off it is again reduced to a powder by the pulverizing process. Sufficient water is then added, and the whole triturated, so that it will form an enameling compound of about the consistency of cream. In this compound I immerse that portion of the brick I desire to enamel, and then subject it to a heat of sufficient temperature to fuse the enameling material on its surface.

The ordinary red building-brick herein named is made of any of the clays commonly used in the manufacture of such brick, and burned in the usual manner.

The surface of the brick to be enameled should be smooth. To this end they should be pressed. It being obvious that the enameled brick will only be used for forming fronts and other parts of the building requiring a fine finish and ornamentation, brick having a rough uneven surface or porous will not answer, for the enameled surface will be uneven in one case, and full of small indentations in the other case.

The enameling compound herein described will flow at a degree of heat which is not sufficient to melt or glaze ordinary red brick used for building purposes.

By adding black oxide of cobalt and black oxide of manganese to the hereinbefore-described enameling compound a beautiful black enamel will be obtained. Suboxide of copper and red oxide of iron will give it a green color. The use of oxide of cobalt will give it a blue color. The use of Brandon mineral paint, manufactured at Brandon, Vermont, will give a drab color. Other coloring matter can be added, and almost any desired tinge of color given to the enamel.

I wish it clearly understood that I do not claim, broadly, enameling brick, for that has been done, as will appear by reference to the patents granted to me June 7, 1869, and January 31, 1871; and also in the patent granted to William S. Thomas, November 9, 1869, and in the patent granted Thomas C. Kier, June 4, 1872. My invention, in contradistinction to these recited inventions, relates to the enameling of the ordinary red brick used for building purposes, the peculiar property of my enameling compound being such that the red brick, after being coated with it, can be stacked in the kiln in the same manner as that practiced in the ordinary process of burning brick, and the enamel will flow and set as perfectly on the surface of the upper brick as it will on the lower brick in the kiln. The foregoing-described results have never been accomplished prior to the date of my invention, and are results that have long been desired in the art.

Having thus described my improvement, what I claim as of my invention is—

The compound of the following ingredients, viz.: Fluor-spar, paris white, lime, oxide of tin, and kaoline in about the proportions specified, and mixed and treated as hereinbefore described, for enameling ordinary red building-brick.

D. W. CLARK.

Witnesses:
 THOS. K. McCLONG,
 J. H. HILLERMAND.